(12) United States Patent
Mandic (10) Patent No.: US 10,521,309 B1
(45) Date of Patent: Dec. 31, 2019

(54) OPTIMIZED FILESYSTEM WALK FOR BACKUP OPERATIONS

(71) Applicant: EMC IP Holding Company LLC, Hopkinton, MA (US)

(72) Inventor: Vladimir Mandic, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 205 days.

(21) Appl. No.: 14/138,525

(22) Filed: Dec. 23, 2013

(51) Int. Cl.
*G06F 11/00* (2006.01)
*G06F 11/14* (2006.01)

(52) U.S. Cl.
CPC ................. *G06F 11/1458* (2013.01)

(58) Field of Classification Search
CPC ............. G06F 11/1469; G06F 11/1451; G06F 11/1458; G06F 11/1453; G06F 11/1466; G06F 11/1446; G06F 11/1461; G06F 17/30575; G06F 17/30997; G06F 17/30097; G06F 17/30581; G06F 17/30174; G06F 3/0665; G06F 3/0637; Y10S 707/99945; Y10S 707/99953
See application file for complete search history.

(56) References Cited

U.S. PATENT DOCUMENTS

| | | | | |
|---|---|---|---|---|
| 5,758,359 A * | 5/1998 | Saxon | ................. | G06F 11/1461 707/644 |
| 5,943,675 A * | 8/1999 | Keith | ................. | G06F 12/0815 |
| 6,434,683 B1 * | 8/2002 | West | ................. | G06F 3/0613 711/161 |
| 6,560,615 B1 * | 5/2003 | Zayas | ................. | G06F 11/1451 707/646 |
| 6,742,092 B1 * | 5/2004 | Huebsch | ............. | G06F 11/1464 711/162 |
| 6,928,458 B2 * | 8/2005 | Cedola | ................. | G06F 11/2082 |
| 7,478,113 B1 * | 1/2009 | De Spiegeleer | .... | G06F 11/1453 |
| 7,890,469 B1 * | 2/2011 | Maionchi | ........... | G06F 17/30067 707/654 |
| 7,974,950 B2 * | 7/2011 | Kaczmarski | ...... | G06F 17/30082 707/640 |
| 8,055,613 B1 * | 11/2011 | Mu | ................. | G06F 17/30144 707/610 |
| 8,762,341 B1 * | 6/2014 | Mahajan | ............. | G06F 11/1448 707/640 |
| 2002/0147736 A1 * | 10/2002 | Isip, Jr. | ............. | G06F 17/30339 |
| 2003/0126247 A1 * | 7/2003 | Strasser | ............. | G06F 11/1458 709/223 |
| 2003/0236956 A1 * | 12/2003 | Grubbs | ............... | G06F 11/1458 711/162 |
| 2004/0205088 A1 * | 10/2004 | Toner | ................. | G06F 17/30067 |
| 2005/0055520 A1 * | 3/2005 | Kappler | ............. | G06F 11/2069 711/162 |
| 2006/0031188 A1 * | 2/2006 | Lara | ................. | G06F 11/0709 |

(Continued)

FOREIGN PATENT DOCUMENTS

EP 1193622 A2 * 4/2002 ....... G06F 17/30575

*Primary Examiner* — Augustine K. Obisesan
(74) *Attorney, Agent, or Firm* — Van Pelt, Yi & James LLP (57) ABSTRACT

The system for backing up data comprises an input interface configured to receive an input set of files. The system for backing up data additionally comprises a processor configured to add modified objects to a list of modified objects in the set of files, and, in the event it is determined to provide the list of modified objects to a backup process, provide the list to the backup process.

30 Claims, 5 Drawing Sheets

(56) References Cited

U.S. PATENT DOCUMENTS

| | | | | |
|---|---|---|---|---|
| 2006/0136510 A1* | 6/2006 | Voronov | ............... | G06F 17/24 |
| 2006/0171523 A1* | 8/2006 | Greenwell | ............. | H04W 4/00 |
| | | | | 379/242 |
| 2006/0259527 A1* | 11/2006 | Devarakonda | .... | G06F 17/30091 |
| 2007/0185938 A1* | 8/2007 | Prahlad | ............. | G06F 17/30212 |
| 2008/0201366 A1* | 8/2008 | Devarakonda | .... | G06F 17/30091 |
| 2008/0222212 A1* | 9/2008 | Prasad | ............. | G06F 17/30206 |
| 2008/0228832 A1* | 9/2008 | Wetmore | ............ | G06F 11/2097 |
| 2009/0150628 A1* | 6/2009 | Nakano | ............... | G06F 11/1469 |
| | | | | 711/162 |
| 2010/0070475 A1* | 3/2010 | Chen | ................... | G06F 11/1461 |
| | | | | 707/640 |
| 2011/0055152 A1* | 3/2011 | Jang | ....................... | G06Q 10/10 |
| | | | | 707/622 |
| 2011/0206862 A1* | 8/2011 | Gatineau | ................ | C23C 16/18 |
| | | | | 427/569 |
| 2011/0307447 A1* | 12/2011 | Sabaa | ................ | H04L 67/2842 |
| | | | | 707/637 |
| 2012/0078852 A1* | 3/2012 | Haselton | ............ | G06F 11/1451 |
| | | | | 707/654 |
| 2012/0079502 A1* | 3/2012 | Kwan | ....................... | G06F 8/71 |
| | | | | 718/106 |
| 2013/0326171 A1* | 12/2013 | Pittelko | ............... | G06F 11/1451 |
| | | | | 711/162 |
| 2015/0120668 A1* | 4/2015 | Rolfe | ................. | G06F 11/1458 |
| | | | | 707/648 |

* cited by examiner

OPTIMIZED FILESYSTEM WALK FOR BACKUP OPERATIONS

BACKGROUND OF THE INVENTION

A traditional process for backup of a filesystem comprises the following sequential workflow: 1) a backup process is started; 2) the backup process begins a filesystem walk to discover modified objects; 3) the backup process saves modified objects and continues the filesystem walk; 4) at the end of the walk, the backup is marked complete. Analyzing the times spend for backup operations has shown that in high-density filesystems (filesystems with large number of small files), the time required to perform a filesystem walk can take up to 80% of the actual backup time. One improvement is a process where the filesystem walk submits each modified object to be processed for backup by independent asynchronous backup processes. Although this approach is superior to traditional backup workflow, it can result in a large percentage of random disk reads on the same area of the disk volume, due to multiple backup processes attempting to backup objects which reside next to each other on the disk.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for backing up data is disclosed. The system for backing up data comprises an input interface configured to receive a set of files. The system for backing up data additionally comprises a processor configured to add modified objects to a list of modified objects in the set of files, and, in the event it is determined to provide the list of modified objects to a backup process, provide the list to the backup process. The system for backing up data additionally comprises a memory coupled to the processor and configured to provide the processor with instructions.

In some embodiments, a base level system for walking a set of files for backup discovers a file that has changed since a last backup and submits this file or project for backup. An improved set of files walk process submits each modified object, as it is discovered, to be processed for backup by independent asynchronous backup processes (e.g., parallel processing to the extent that there are independent parallel processes). Although this approach is superior to traditional backup workflow, it can result in a large percentage of random disk reads on the same area of the disk volume, due to multiple backup processes reading backup objects which reside next to each other on the disk. A further improvement queues modified objects into a buffer as they are read from disk during the set of files walk. Once the buffer becomes full, it is determined that the buffer needs to be sent, or the set of files walk traverses a volume boundary, the buffer is sent to the backup process for backup. A full buffer or a buffer that needs to be sent is determined by comparing a buffer with a threshold amount of data or a threshold number of files, or a combination of the two thresholds. Queuing a set of files stored physically near one another into a buffer before sending them to the backup process ensures that they are read sequentially from disk, minimizing the total amount of disk activity required to read the files and improving the backup speed. In some embodiments, overall disk activity is always the same (e.g., amount of data read from disk) for the different walk processes, but buffering objects in a buffer during the walk results in less disk movement activity since near-by objects are read sequentially without interruptions by other backup processes that result in frequent disk repositioning (e.g., technically this means that majority of read I/O is performed using sequential access instead of requiring random access and penalties that come with it).

In various embodiments, a set of files to walk comprises a complete system, a list of filesystems, a single filesystem, a mount point, any logical object that is used to aggregate files (e.g. folder), or any other appropriate set of files.

Figure 1:
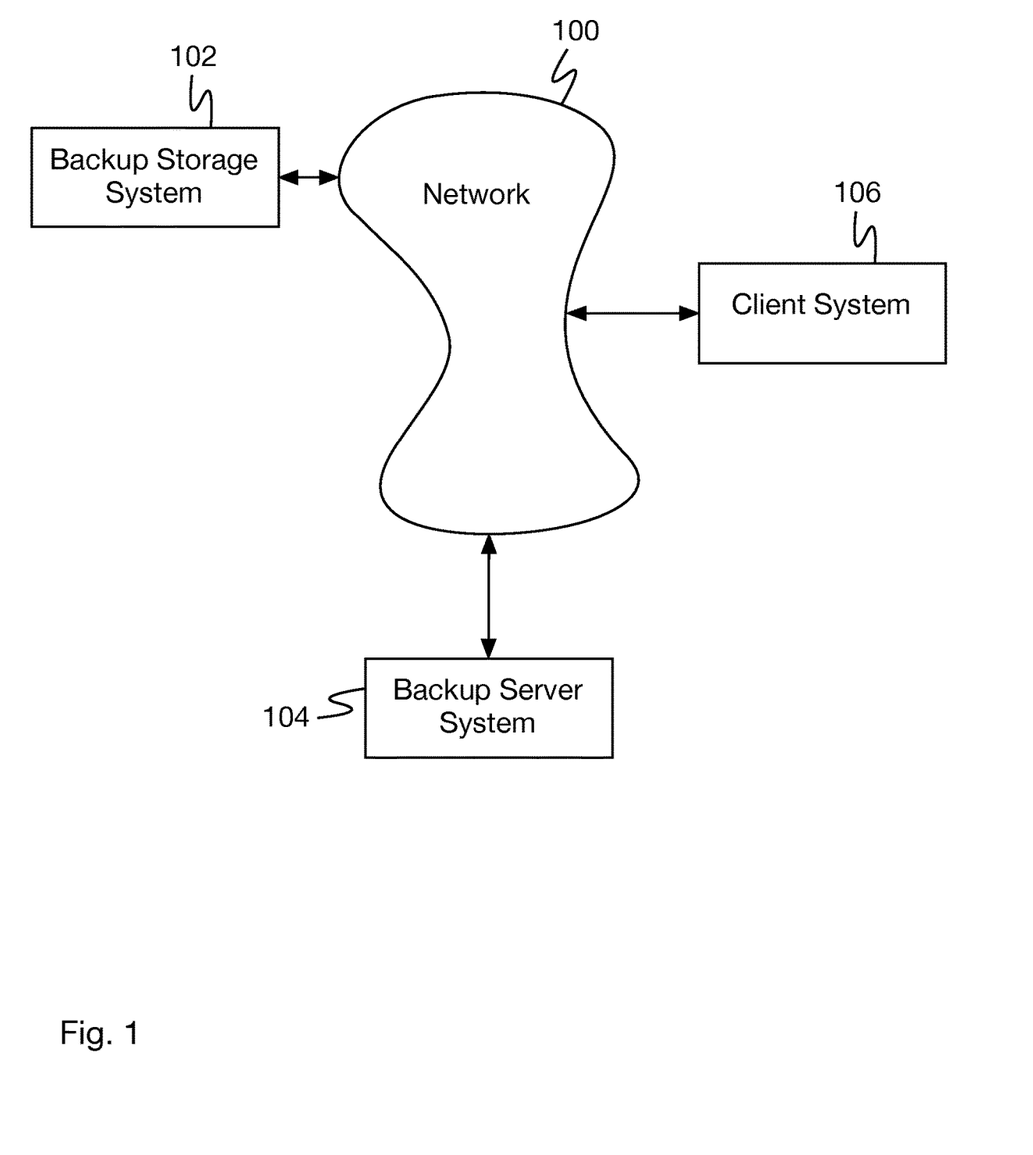
FIG. 1 is a block diagram illustrating an embodiment of a system for an improved set of files walk process.

FIG. 1 is a block diagram illustrating an embodiment of a system for an improved set of files walk process. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. In the example shown, client system 106 comprises a client system (e.g., a computing system for operation by a user). In some embodiments, client system 106 comprises a system accessed by a user directly (e.g., the user is in proximity with client system 106). In some embodiments, client system 106 comprises a system accessed by a user remotely (e.g., the user is not in proximity with client system 106, and accesses client system 106 via network 100 and a separate user system). Client system 106 comprises a system running enterprise software (e.g., business software for creating data, storing data, transmitting data, receiving data, etc.). In some embodiments, client system 106 comprises a system for storing data on a backup system or retrieving stored data from a backup system. In various embodiments, there are 1, 4, 17, 22, 1459, or any other appropriate number of client systems communicating with network 100. Backup storage system 102 comprises a computer system for backing up data. Backup system 102 backs up data stored on client system 106. In various embodiments, backup system 102 performs full backups of the data on client system 106 (e.g., makes complete copies of the data), performs incremental backups of the data on client system 106 (e.g., makes copies of data modified since the last backup), performs a combination of full and incremental backups of the data on client system 106, or performs any other appropriate kind of backup. In some embodiments, data stored on backup system 102 comprises deduplicated backup data (e.g., data is stored in such a way that multiple copies of the same data are only stored a single time). In some embodiments, deduplicated backup data is segmented (e.g., broken into chunks which can then be compared to determine duplicate data). In some embodiments, deduplicated backup data is segmented using a hash function (e.g., a hash function is used to determine where to divide data into segments). In various embodiments, there are 1, 2, 7, 12, 45, 138, or any other appropriate number of backup storage systems communicating with network 100. Backup server system 104 comprises a server system for controlling backup storage system 102 and client system 106.

Figure 2:
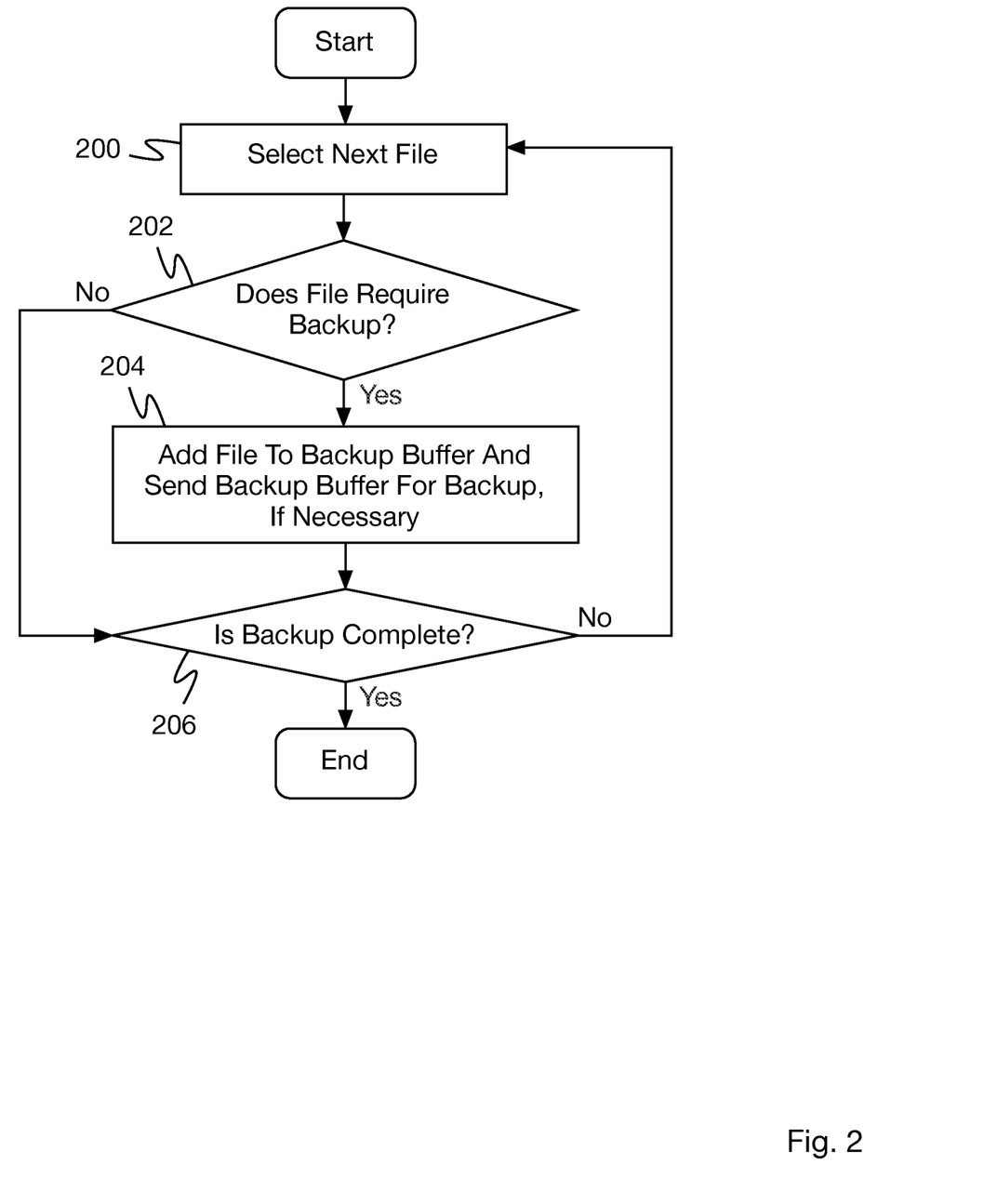
FIG. 2 is a flow diagram illustrating an embodiment of a process for backing up a set of files.

FIG. 2 is a flow diagram illustrating an embodiment of a process for backing up a set of files. In some embodiments, the process of FIG. 2 is used to back up a set of files of a client system (e.g., client system 106 of FIG. 1) onto a backup storage system (e.g., backup storage system 102 of FIG. 1). In some embodiments, the process of FIG. 2 is executed by the client system to determine a set of files to back up and send the files to the backup storage system. In various embodiments, the set of files to back up comprises a complete system, a list of filesystems, a single filesystem, a mount point, any logical object that is used to aggregate files (e.g. folder), or any other appropriate set of files. In the example shown, in 200, the next file is selected. In some embodiments, the next file comprises the first file. In 202, it is determined whether the file requires backup. In some embodiments, the file requires backup if there is not a matching copy of it on the backup storage system. In some embodiments, the file requires backup in the event that a copy is not present on a backup storage device and is designated as a file that is supposed to be backed up. In the event it is determined in 202 that the file does not require backup, control passes to 206. In the event it is determined in 202 that the file requires backup, control passes to 204. In 204, the file is added to a backup buffer, and the backup buffer is sent for backup, if necessary. In 206, it is determined whether the backup is complete. In the event it is determined in 206 that the backup is not complete, control passes to 200. For example, it is determined whether there are more files to be processed (e.g., determine whether they require to be backed up and if so added to a list in a buffer). In the event it is determined in 206 that the backup is complete, the process ends.

Figure 3:
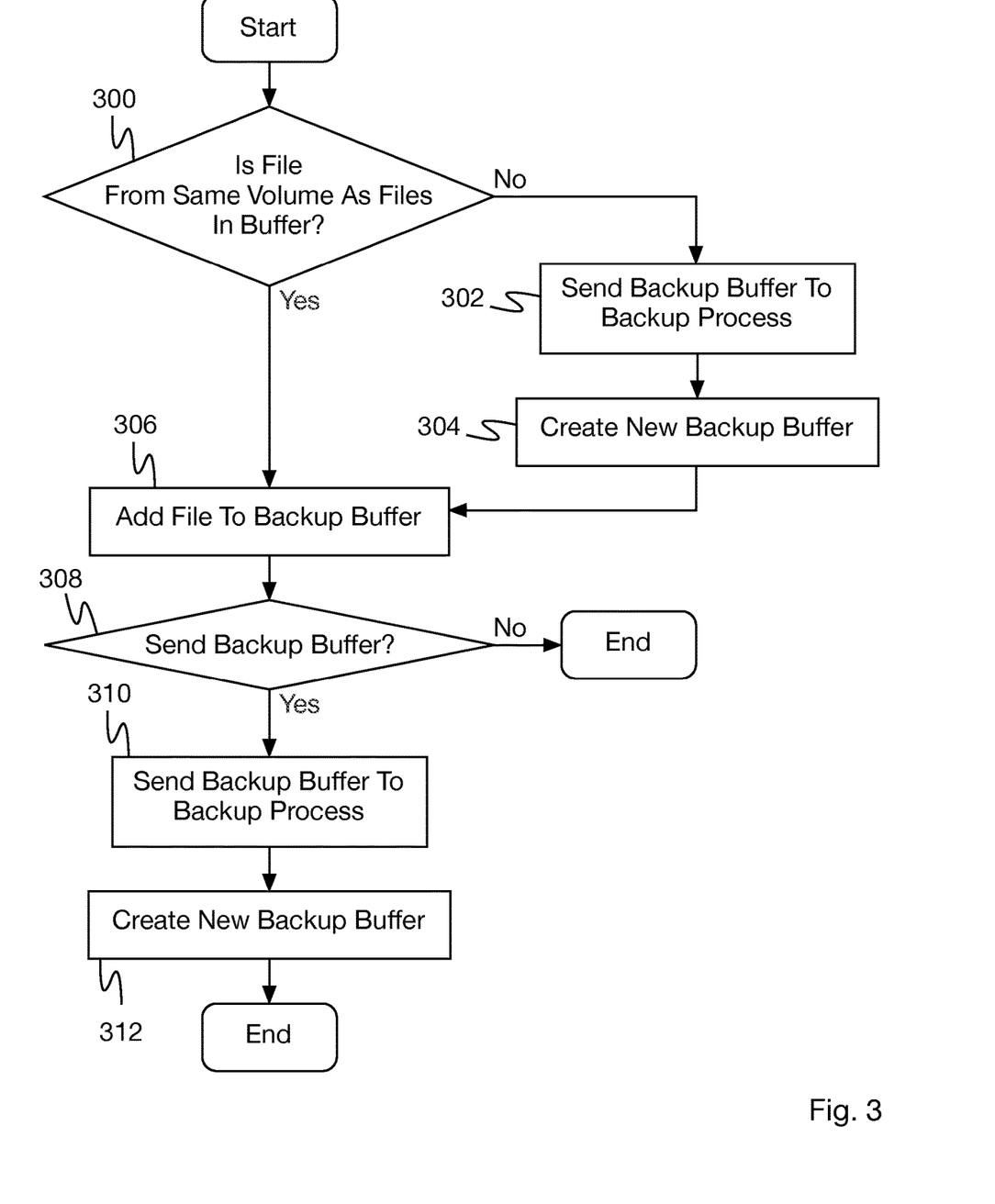
FIG. 3 is a flow diagram illustrating an embodiment of a process for adding a file to a backup buffer and sending the backup buffer for backup, if necessary.

FIG. 3 is a flow diagram illustrating an embodiment of a process for adding a file to a backup buffer and sending the backup buffer for backup, if necessary. In some embodiments, the process of FIG. 3 implements 204 of FIG. 2. In the example shown, in 300, it is determined if the file is from the same volume as the files in the buffer (e.g., if the volume within the client storage that the file is stored in is the same volume that the files in the buffer are stored in). If it is determined in 300 that the file is not from the same volume as the files in the buffer, control passes to 302. For example, if the file is added to the list of objects in the buffer then the list of objects would be from more than one volume, then the file is not from the same volume as the other files in the list. In 302, the backup buffer is sent to a backup process. For example, objects (e.g., files) in the list in the backup buffer are queued to be read from storage (e.g., read as a contiguous set of files, read in a single access to the storage device, read as multiple reads but in sequence (e.g., to minimize seek times, targets minimum seek times, to minimize access times, targets minimum access time, etc.), read in multiple reads but all from locations in close proximity on a storage device, etc.), sent to a backup system, and stored as part of an incremental backup on a backup server. The objects can be accessed from the backup system and used to restore the object as of the time of the backup of the incremental backup. In some embodiments, a backup process reads the files stored in the backup buffer and backs them up (e.g., to a backup storage device). In 304 a new backup buffer (e.g., an empty backup buffer) is created. Control then passes to 306. If it is determined in 300 that the file is from the same volume as the files in the buffer, control passes to 306. In 306, the file is added to the backup buffer. In some embodiments, adding a file to a backup buffer comprises adding a reference to the file to the backup buffer. In various embodiments, a reference to the file comprises the file name, the file path, the file size, a file identifier, or any other appropriate reference to the file. In 308, it is determined whether to send the backup buffer. In some embodiments, determining whether to send the backup buffer comprises comparing the total size of files in the backup buffer to a size threshold (e.g., files are within 10% of a size threshold, are larger than a threshold, etc.) and in the event that the comparison meets a criteria (e.g., greater than, within a percentage, greater than and within a percentage, etc.) then the buffer is sent to a process that backs up the files (e.g., sends the files to a backup storage system). In some embodiments, determining whether to send the backup comprises comparing the number of files in the backup buffer to a file number threshold (e.g., files are within 10% of a number of file threshold, are larger than a number of file threshold, etc.) and in the event that the comparison meets a criteria (e.g., greater than, within a percentage, greater than and within a percentage, etc.) then the buffer is sent to a process that backs up the files (e.g., sends the files to a backup storage system). In various embodiments, determining whether to send the backup buffer comprises a comparison of the total size of the files in the buffer with a size threshold and/or a comparison of the total number of files in the buffer with a file number threshold. If it is determined in 308 that the backup buffer is not to be sent, the process ends. If it is determined in 308 that the backup buffer is to be sent, control passes to 310. In 310, the backup buffer is sent to a backup process. For example, objects (e.g., files) in the list in the backup buffer are queued to be read from storage (e.g., read as a contiguous set of files, read in a single access to the storage device, read as multiple reads but in sequence (e.g., to minimize seek times, targets minimum seek times, to minimize access times, targets minimum access time, etc.), read in multiple reads but all from locations in close proximity on a storage device, etc.), sent to a backup system, and stored as part of an incremental backup on a backup server. The objects can be accessed from the backup system and used to restore the object as of the time of the backup of the incremental backup. In 312, a new backup buffer is created.

Figure 4:
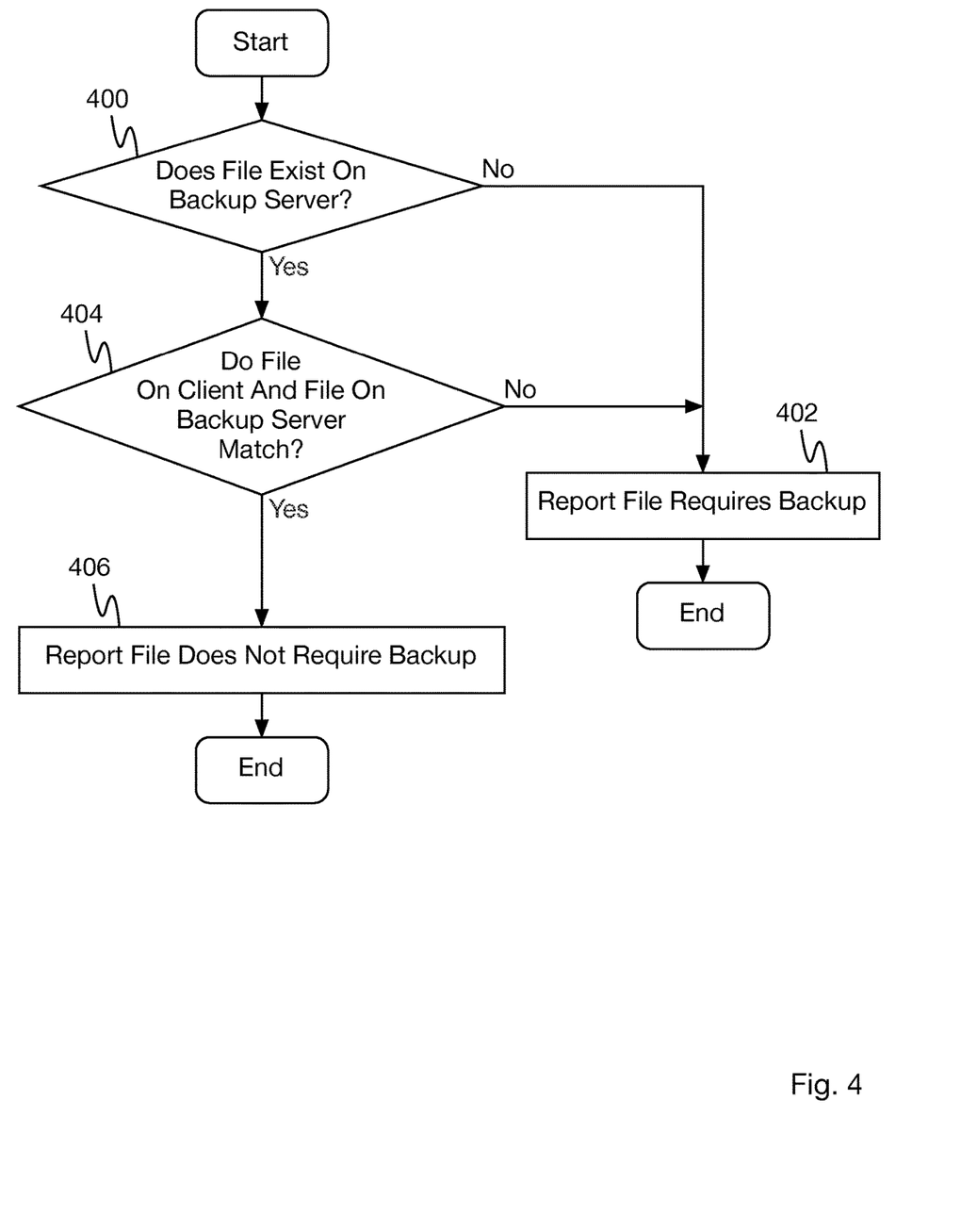
FIG. 4 is a flow diagram illustrating an embodiment of a process for determining whether a file requires backup.

FIG. 4 is a flow diagram illustrating an embodiment of a process for determining whether a file requires backup. In some embodiments, the process of FIG. 4 implements 202 of FIG. 2. In the example shown, in 400, it is determined whether the file exists on the backup server. If it is determined that the file does not exist on the backup server, control passes to 402. In 402, it is reported (e.g., to the process of FIG. 2) that the file requires backup. For example, it is indicated that the file needs to be backed up (e.g., a flag is set associated with the file, a pointer is listed in a file, etc.). If it is determined in 400 that the file exists on the backup server, control passes to 404. In 404, it is determined whether the file on the client and the file on the backup server match. In various embodiments, determining whether the file on the client and the file on the backup server match comprises comparing the files, comparing hashes of the files, comparing checksums of the files, comparing identifier data for the files, or comparing any other appropriate information. If it is determined in 404 that the file on the client and the file on the backup server do not match, control passes to 402. If it is determined in 404 that the file on the client and the file on the backup server match, control passes to 406. In 406, it is reported (e.g., to the process of FIG. 2) that the file does not require backup.

Figure 5:
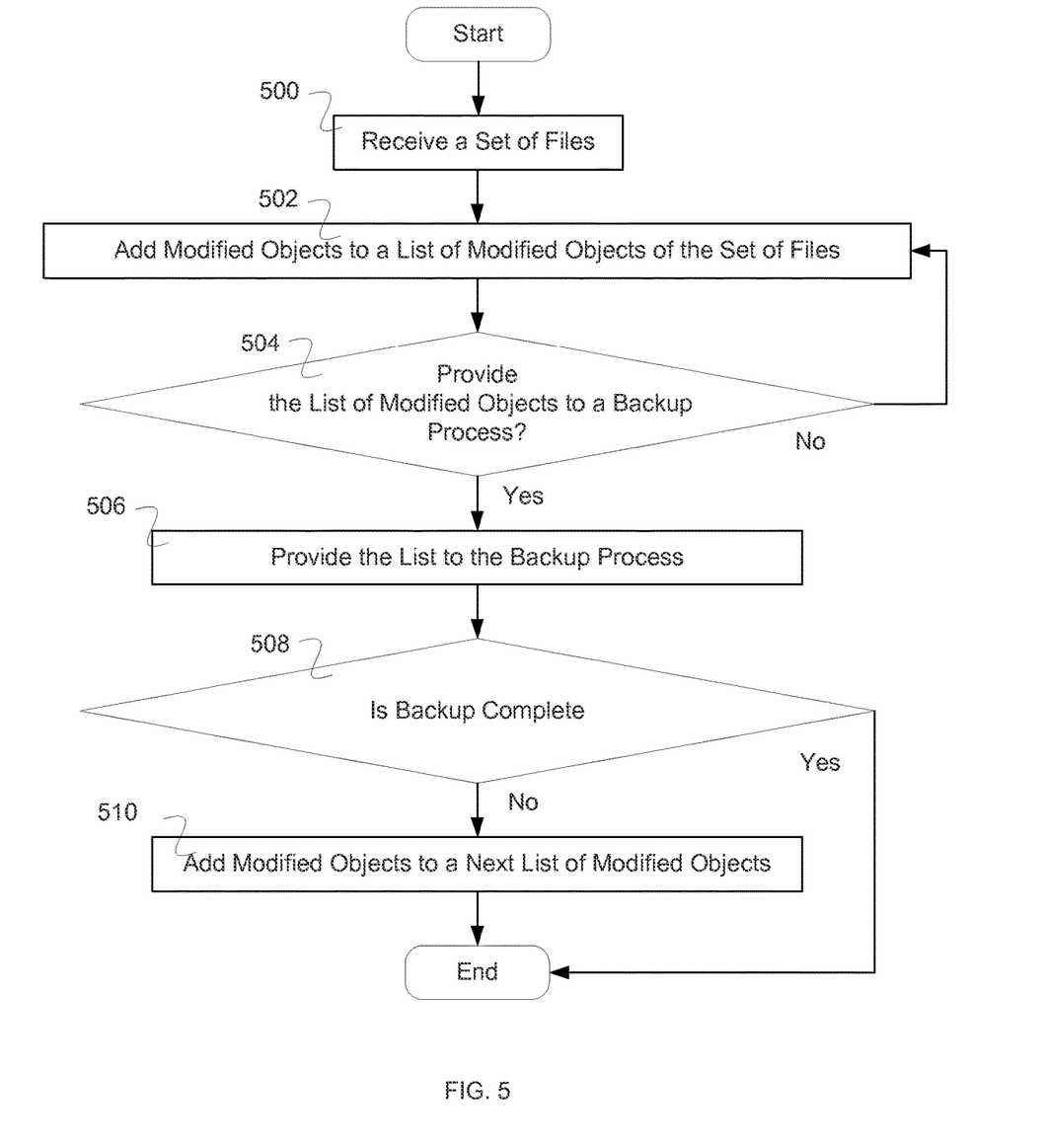
FIG. 5 is a flow diagram illustrating an embodiment of a process for backing up data.

FIG. 5 is a flow diagram illustrating an embodiment of a process for backing up data. In some embodiments, the process of FIG. 5 is executed by a client system. In the example shown, in 500, a set of files is received. In some embodiments, the set of files comprises a client system filesystem. In various embodiments, the set of files received comprises a set of files to walk—for example, the set of files comprises one or more of the following: a complete system, a list of file systems, a single file system, a mount point, any logical object that is used to aggregate files (e.g. folder), or any other appropriate set of files. In 502, modified objects are added to a list of modified objects of the set of files. For example, modified objects are added to a list of modified objects in the set of files. In 504, it is determined whether to provide the list of modified objects to a backup process. In various embodiments, determining to provide the list of modified objects to a backup process is based at least in part on the total file size of the files on the list, on the number of objects in the list, on the location of a volume boundary within the filesystem, on the location of a volume boundary within a set of files, or on any other appropriate criterion. If it is determined in 504 that the list of modified objects should not be provided to a backup process, control passes to 502. If it is determined in 504 that the list of modified objects should be provided to a backup process, control passes to 506. In 506, the list is provided to the backup process. In 508, it is determined whether the backup is complete. In some embodiments, determining whether the backup is complete comprises determining whether all files in the file system have been part of a list provided to a backup process. If it is determined in 508 that the backup is not complete, control passes to 510. In 510, modified objects are added to a next list of modified objects. In some embodiments, adding modified objects to a next list of modified objects comprises control passing to 502. If it is determined in 508 that the backup is complete, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for backing up data, comprising:
an input interface configured to receive a set of files; and
a processor configured to:
add modified objects to a list of modified objects in the set of files, wherein to add modified objects to the list of modified objects comprises:
in response to a determination that a modified object of the modified object is identified, determining whether the identified modified object is within a defined proximity of other modified objects included on the list of modified objects, and
in response to a determination that the identified modified object is determined to not be within the defined proximity the other modified objects, creating a new list of modified objects and adding the identified modified object to the new list of modified objects;
determine whether to provide the list of modified objects to a backup process based at least in part on one or more of a threshold amount of data or a threshold number of files included in the list of modified objects; and
in response to a determination to provide the list of modified objects to the backup process:
provide the list to the backup process for backup, wherein the backup process processes the list in connection with backing up one or more of the modified objects.

2. The system of claim 1, wherein determining to provide the list of modified objects to a backup process is based at least in part on the total file size of the list.

3. The system of claim 2, wherein the total file size of the list is compared to a size threshold.

4. The system of claim 1, wherein determining to provide the list of modified objects to a backup process is based at least in part on the number of files in the list.

5. The system of claim 4, wherein the number of files in the list is compared to a file number threshold.

6. The system of claim 1, wherein determining to provide the list of modified objects to a backup process is based at least in part on a location of a volume boundary within the set of files.

7. The system of claim 1, wherein the processor is further configured to determine whether there are more files of the set of files to process.

8. The system of claim 7, wherein in response to a determination that more files of the set of files to process are to be processed, then the processor is further configured to select a next file for processing.

9. The system of claim 1, wherein the backup process queues the modified objects in the list to be read.

10. The system of claim 9, wherein the modified objects in the list are read in a single access to storage device.

11. The system of claim 9, wherein the modified objects in the list are read in multiple reads in a sequence.

12. The system of claim 11, wherein the sequence targets a minimum seek time.

13. The system of claim 11, wherein the sequence targets a minimum access time.

14. The system of claim 1, wherein the set of files comprises one or more of the following: a complete system, a list of filesystems, a single filesystem, a mount point, a logical object that is used to aggregate files, or a folder.

15. The system of claim 1, wherein the one or more modified objects are stored on a backup server in connection with an incremental backup.

16. The system of claim 1, wherein the processor is further configured to determine whether to provide the new list of modified objects to the backup process based at least in part on one or more of the threshold amount of data or the threshold number of files included in the list.

17. The system of claim 1, wherein the list of modified objects and the new list of modified objects are associated with different backup buffers.

18. The system of claim 1, wherein determining, in connection with walking of a set of files, whether to add the modified objects to the list of modified objects in the set of files based on whether the modified objects have changed since a last backup.

19. The system of claim 1, wherein determining whether the identified modified objects are within the defined proximity of other modified objects comprises determining that the identified modified objects are from a same volume as the other modified objects included on the list of modified objects.

20. The system of claim 1, wherein the determining whether the identified modified object is within the defined proximity of the other modified objects included on the list of modified objects includes determining whether the identified object is stored on a volume that is the same as one or more volumes on which the other modified objects included in the list of modified objects are stored.

21. The system of claim 1, wherein the processor is further configured to determine whether to add the modified objects to the list of modified objects to be provided to the backup process based at least in part on a determination of whether a backup storage system comprises the corresponding modified object.

22. The system of claim 1, wherein the processing the list in connection with the backing up the one or more of the modified objects comprises:
  reading a plurality of objects in the list of modified objects from a storage volume on which the plurality of objects are stored, the plurality of objects being read in a sequential manner based on a corresponding physical storage locations of the plurality of objects.

23. The system of claim 22, wherein the reading of the plurality of objects does not comprise random access.

24. The system of claim 23, wherein the one or more modified objects are read from storage in a single access to a storage device on which the one or more modified objects are stored.

25. The system of claim 22, wherein the plurality of objects are read in a sequence determined according to the corresponding physical storage locations of the plurality of objects.

26. The system of claim 22, wherein the plurality of objects are read in a manner based on a determination that minimizes one or more of seek times and access times.

27. The system of claim 1, wherein the backup process queues the one or more modified objects in the list such that the backup process reads the one or more modified objects from storage in a single access to a storage device on which the one or more modified objects are stored.

28. The system of claim 1, wherein the backup process queues the one or more modified objects in the list such that the backup process reads the one or more modified objects from storage in a sequential manner based on a corresponding physical storage locations of the plurality of objects.

29. A method for backing up data, comprising:
  receiving a set of files;
  adding, using a processor, modified objects to a list of modified objects in the set of files, wherein adding modified objects to the list of modified objects comprises:
    in response to a determination that a modified object of the modified object is identified, determining whether the identified modified object is within a defined proximity of other modified objects included on the list of modified objects, and
    in response to a determination that the identified modified object is determined to not be within the defined proximity of the other modified objects, creating a new list of modified objects and adding the identified modified object to the new list of modified objects;
  determining whether to provide the list of modified objects to a backup process based at least in part on one or more of a threshold amount of data or a threshold number of files included in the list; and
  in response to a determination to provide the list of modified objects to the backup process:
    providing the list to the backup process for backup, wherein the backup process processes the list in connection with backing up one or more of the modified objects.

30. A computer program product for backing up data, the computer program product being embodied in a non-transitory computer readable storage medium and comprising computer instructions for:
  receiving a set of files;
  adding modified objects to a list of modified objects in the set of files, wherein adding modified objects to the list of modified objects comprises:
    in response to a determination that a modified object of the modified object is identified, determining whether the identified modified object is within a defined proximity of other modified objects included on the list of modified objects, and
    in response to a determination that the identified modified object is determined to not be within the defined proximity of the other modified objects, creating a new list of modified objects and adding the identified modified object to the new list of modified objects;
  determining whether to provide the list of modified objects to a backup process based at least in part on one or more of a threshold amount of data or a threshold number of files included in the list; and
  in response to a determination to provide the list of modified objects to the backup process:
    providing the list to the backup process for backup, wherein the backup process processes the list in connection with backing up one or more of the modified objects.

* * * * *